(12) United States Patent
Badenell

(10) Patent No.: US 7,752,448 B1
(45) Date of Patent: Jul. 6, 2010

(54) DOMAIN-BASED APPLICATION FUNCTIONALITY

(75) Inventor: Jon Edward Badenell, Marietta, GA (US)

(73) Assignee: The Weather Channel, Inc., Atlanta, GA (US)

( * ) Notice: Subject to any disclaimer, the term of this patent is extended or adjusted under 35 U.S.C. 154(b) by 1882 days.

(21) Appl. No.: 10/779,946

(22) Filed: Feb. 17, 2004

(51) Int. Cl.
*G06F 21/24* (2006.01)

(52) U.S. Cl. .................. 713/177; 713/173; 713/175; 713/176; 713/179; 713/180; 713/182; 713/185

(58) Field of Classification Search .............. 713/172, 713/173, 175, 176, 179, 180, 182, 185, 189, 713/193
See application file for complete search history.

(56) References Cited

U.S. PATENT DOCUMENTS 4,405,829 A * 9/1983 Rivest et al. .............. 380/30
4,625,076 A * 11/1986 Okamoto et al. ........... 713/176

OTHER PUBLICATIONS

Dierks et al., RFC 2246—The TLS Protocol Version 1.0, The Internet Society, Jan. 1999, pp. 29-47.*

* cited by examiner

*Primary Examiner*—Minh Dinh
(74) *Attorney, Agent, or Firm*—Lawrence A. Aaronson, P.C.

(57) ABSTRACT

Systems and methods of providing a desktop framework. The desktop framework may include an application framework component that includes a set of core libraries that provide desktop applications access to data and services, a download component that maintains versions of the desktop applications and core libraries installed on a computer, and a license component that tracks data use and access. The application framework exposes APIs to provide the desktop applications with access to the data and services. The application framework serves as a platform upon which the desktop applications share common data and logic.

3 Claims, 2 Drawing Sheets

DOMAIN-BASED APPLICATION FUNCTIONALITY

FIELD OF THE INVENTION

This invention relates in general to the field of software application functionality. More particularly, this invention relates to a system and method of enabling or disabling a functionality in a web browser or browser-based application based on the receipt of a token from a web site.

BACKGROUND OF THE INVENTION

Web browsers and applications enabled to browse Web servers have advanced greatly since the first browser was introduced in the early 1990's. In particular, many different features and content can be viewed through browsers in addition to static web pages. However, the controls placed on the content and how web browsers function are limited. Access to content is typically limited by authorizing visitors using conventional methods, such as user name and/or password, IP address, etc.

Further, web sites and content providers do not have any control over the functionality of a user's web browser or browser-enabled applications. In other words, web sites and content providers cannot control how the browser operates. This is desirable as providers of content may want to control how web sites use their content through a mechanism that enables or disables the web browser's ability to render and/or display their content based on a web site's particular relationship with the content provider.

Thus, it would be beneficial if there was a mechanism to control the functionality of web browsers or other application programs in accordance a web site's relationship with content providers. Such a mechanism would serve to protect intellectual property rights and revenue streams of content providers. The present invention provides such a solution.

SUMMARY OF THE INVENTION

The present invention is directed to systems and methods of controlling the functionality of an application program. The method includes contacting a server; receiving a response from the server containing a token; interpreting information contained in the token; and invoking a level of functionality in the application program in accordance with the token.

In accordance with a feature of the invention, the application program comprises a web browser. In addition, the token may be encrypted and the method may further include decrypting the token. The token may be a hash of the server's domain name, or a digital certificate based on the server's domain name.

In accordance with another feature, the level of functionality includes at least one of scheduling pop-up ads, audio playback, video playback, and plug-in support. In addition, the application program may include a browser control that invokes a viewer.

In accordance with another aspect of the invention, there is provided a method of affecting the functionality of an application program. The method includes contacting a server; receiving a response from the server; parsing the response for a token; interpreting information contained in the token; and invoking a level of functionality in the application program in accordance with the information contained in the token.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Exemplary Computing Environment

Figure 1:
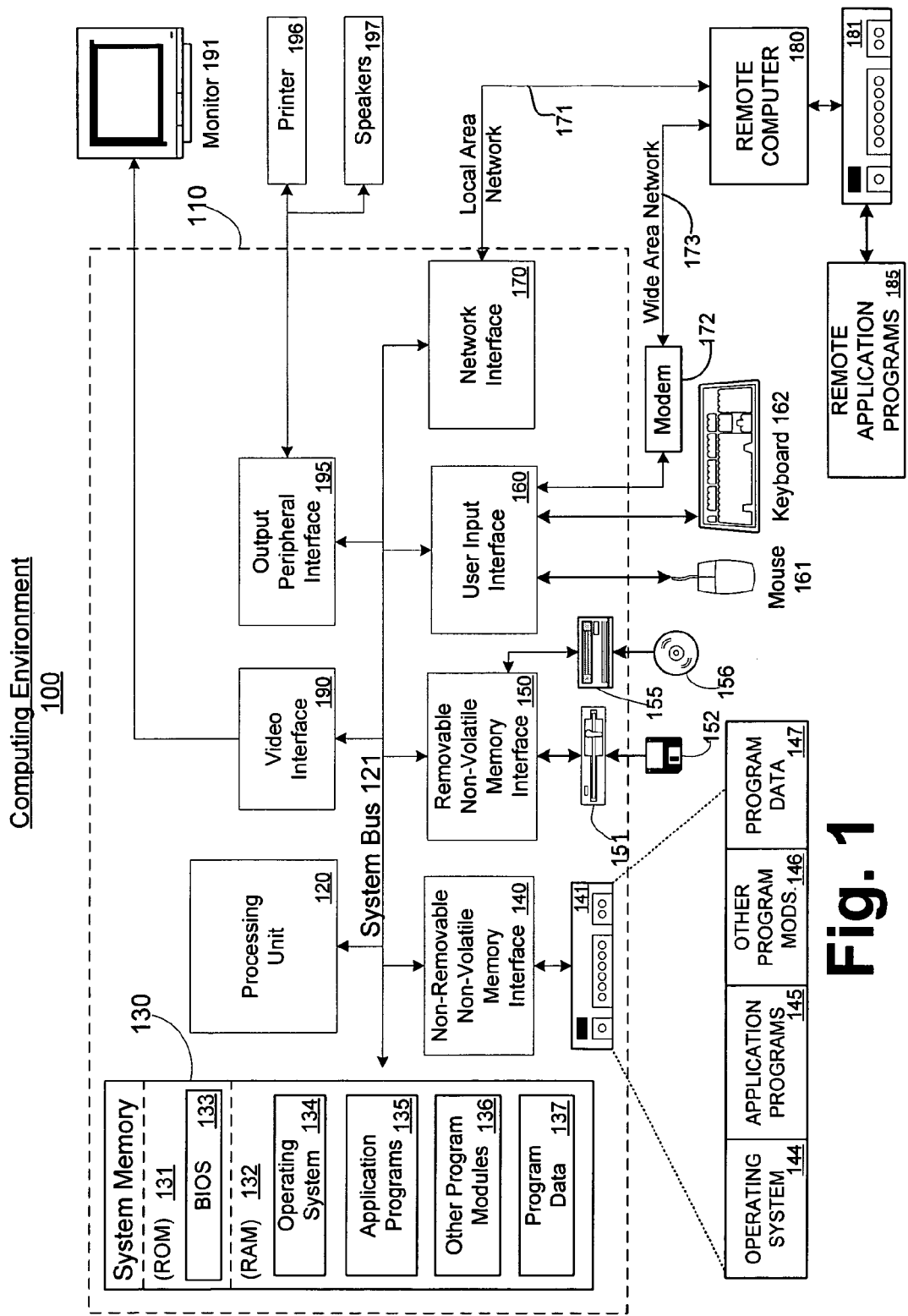
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Embodiments of the Present Invention

Figure 2:
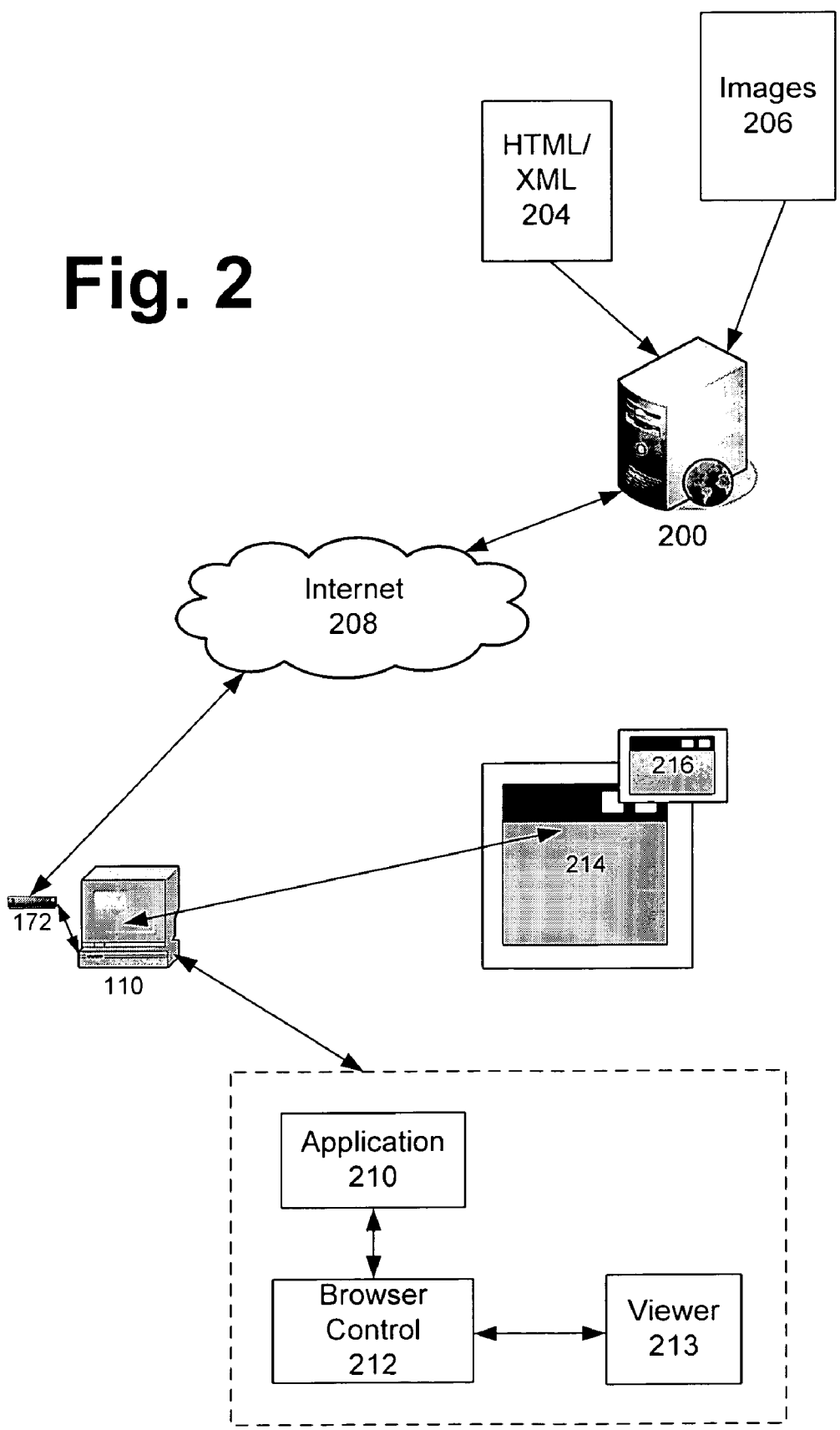
FIG. 2 illustrates an example of how an application program uses a browser and/or browser control to fetch and display HTML/XML documents.

The present invention is directed to a web browser or browser-enabled application that receives a token from web sites that enables/disables functionalities of the browser. FIG. 2 illustrates an example of a web browser 214 and/or an application 210 that uses a browser control 212 to fetch and display HTML/XML documents in accordance with the present invention. In this implementation, the web browser 214 may be Internet Explorer, Netscape Navigator, etc. The application 212 may be any application that calls a browser control to view content over, e.g., the Internet. The web browser 214 fetches HTML/XML documents via the computer 110 and the modem 172 (e.g., cable modem, DSL modem, or conventional modem). The modem 172 communicates over the Internet 208 (Intranet, WAN, etc.) to a web server 200 that serves, e.g., HTML/XML documents 204 and images 206.

The browser control 212 may invoke its own viewer 213 or the web browser 214. The browser control server program 212 is implemented as, e.g., a dynamic link library (DLL) and is dynamically linked with each application program (such as application program 210) that uses a browser control to launch a browser 214 or other hypertext viewer window 213 to render an HTML/XML documents into a frame in the computer's display screen 191. The browser control 212 and hypertext viewer 213 shown in FIG. 2 may be software objects which conform to Microsoft Corporation's Component Object Model (COM), and support various ActiveX® (also known as Object Linking and Embedding ("OLE")) interfaces.

When a user connects to the web server 200, buy navigating to a specified URL, the browser 214 or viewer 213 via the application 210 points to URL of the document to be retrieved. A TCP/IP connection is established with the web server 200 and a request is issued for the document stored at the specified URL by issuing an HTTP request to the server 200. The URL provided by the application refers to the HTML/XML document(s) 204 stored at the web server 200. An addition to HTML code, this document can incorporate other information content, such as images 206, audio, video, executable programs, etc. The document 204 and images 206 are stored as files in a file system of the web server 200. The document 204 may incorporate the images 206 using HTML tags that specify the location of files or other Internet resource containing the images on the Internet 208.

In accordance with the present invention, a token is communicated from the server 200 to the browser 214 or viewer 213 after a document is requested. The token is preferably a text string embedded in the HTML or HTTP response headers, and is preferably a hash or digital signature of the web site's domain name and/or other information. Such cryptographic tokens are well known in the art. The token may also include an expiration date. When the browser 214 receives this token, it is decrypted and based on the results, certain browser functionality is enabled or disabled. Such functionalities include, but are not limited to, pop-up ads, video and/or audio content, plug-ins, controls, etc. By using a token in accordance with the present invention, content providers/vendors are able to control what features are present in the browser, as well as the content that may be displayed by the browser. This feature enables also control over media distribution to prevent unauthorized or illegal use of content. Thus, after contacting the web site 200, the web browser 214 or viewer 213 renders the HTML/XML code in the document 204 and displays the document and related graphical content with the functionalities enabled by the token.

In accordance with the present invention, a centralized vendor may license or sell tokens to the web sites as a way to collect licensing fees or royalties to enable full or enhanced functionality. A web site without a token may invoke a standard or reduced level of functionality. However, a web site with a token may invoke a full or enhanced level of functionality in the browser 214. Also, pop-up ads, plug-in functionality, audio, video, etc. (collectively shown as window 216) may scheduled or invoked based on the content of the token. As such, web sites that wish to enable pop-up ads or special content may purchase tokens from the centralized vendor, who in turn receives and distributes license fees to providers of content of the pop-up ads or special content.

While the present invention has been described in connection with the preferred embodiments of the various Figs., it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method of controlling the functionality of an application program, comprising:
   contacting a server;
   receiving a response from the server, the response containing a token;
   interpreting information contained in said token; and
   invoking a level of functionality in said application program in accordance with said token,
   wherein invoking a level of functionality of said web site at said browser further comprises:
   invoking a full level of functionality of said web site at said browser when said web site has said token; and
   invoking a reduced level of functionality of said web site at said browser when said web site does not have said token.

2. The method of claim 1, wherein associating said token with said web site and invoking a level of functionality of said web site further comprises preventing unauthorized use of content.

3. The method of claim 1, wherein providing a token to a web site further comprises:
   centralizing said tokens under the control of a centralized vendor; and
   collecting a fee from web sites for use of said tokens.

* * * * *

UNITED STATES PATENT AND TRADEMARK OFFICE
CERTIFICATE OF CORRECTION

PATENT NO. : 7,752,448 B1 Page 1 of 1
APPLICATION NO. : 10/779946
DATED : July 6, 2010
INVENTOR(S) : Jon Edward Badenell It is certified that error appears in the above-identified patent and that said Letters Patent is hereby corrected as shown below:

Col. 6, lines 34-48
Claim 1 is replaced with the following:

--1. A method for content providers to control features that are presented in a browser, said method comprising:

providing a token to a web site;

associating said token with said web site;

receiving at a web server a request for information for said web site from a browser; and invoking a level of functionality of said web site at said browser based on a presence or absence of said token, wherein invoking a level of functionality of said web site at said browser further comprises:

invoking a full level of functionality of said web site at said browser when said web site has said token; and invoking a reduced level of functionality of said web site at said browser when said website does not have said token.--

Signed and Sealed this

Twelfth Day of October, 2010

David J. Kappos
*Director of the United States Patent and Trademark Office*